US011827150B2

(12) United States Patent
Saxena et al.

(10) Patent No.: US 11,827,150 B2
(45) Date of Patent: Nov. 28, 2023

(54) COMPUTER-IMPLEMENTED OBJECT VISIBILITY IMPROVEMENT BY INTERPOSING AN IMAGE IN A VIEWER'S LINE-OF-SIGHT

(71) Applicant: INTERNATIONAL BUSINESS MACHINES CORPORATION, Armonk, NY (US)

(72) Inventors: Rajesh Kumar Saxena, Maharashtra (IN); Harish Bharti, Pune (IN); Deepak Bajaj, Leicester (GB); Zheng Xie, Clontarf (IE); Sandeep Sukhija, Rajasthan (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 17/480,657

(22) Filed: Sep. 21, 2021

(65) Prior Publication Data
US 2023/0091837 A1    Mar. 23, 2023

(51) Int. Cl.
*B60R 1/00* (2022.01)
*G02B 27/01* (2006.01)
(Continued)

(52) U.S. Cl.
CPC ............ *B60R 1/00* (2013.01); *G02B 27/0101* (2013.01); *G06F 3/013* (2013.01); *G06T 3/40* (2013.01);
(Continued)

(58) Field of Classification Search
CPC ............... B60R 1/00; B60R 2300/301; B60R 2300/8053; G02B 27/0101;
(Continued)

(56) References Cited

U.S. PATENT DOCUMENTS 9,796,332 B2    10/2017  Lu et al.
2009/0102858 A1  4/2009  Eggers et al.
(Continued)

OTHER PUBLICATIONS

Santos, M., "Virtual Windshields: Merging Reality and Digital Content to Improve the Driving Experience", Jul. 2013, 115 pgs.
(Continued)

*Primary Examiner* — Terrell M Robinson
(74) *Attorney, Agent, or Firm* — Michael A. Petrocelli; Matthew M. Hulihan; Heslin Rothenberg Farley & Mesiti PC

(57) ABSTRACT

Object overlay for vehicle occupants includes determining that visibility of an object in a view of a vehicle occupant through a transparent surface of the vehicle is degraded, the object being in an environment in which the vehicle travels, selecting from an image repository a reference image of the object, extracting, from the reference image, an image portion comprising an image of a least a portion of the object, transforming the extracted image portion to correspond to the view of the vehicle occupant, the transforming producing a transformed image portion, and displaying the transformed image portion on the transparent surface and interposed in a line-of-sight of the vehicle occupant to the object in the environment such that the transformed image portion overlays at least a portion of the vehicle occupant's view through the transparent surface to the object in the environment.

20 Claims, 7 Drawing Sheets

(51) Int. Cl.
*G06F 3/01* (2006.01)
*G06T 3/40* (2006.01)
*G06T 3/60* (2006.01)
*G06T 15/10* (2011.01)

(52) U.S. Cl.
CPC .............. *G06T 3/608* (2013.01); *G06T 15/10* (2013.01); *B60R 2300/301* (2013.01); *B60R 2300/8053* (2013.01); *G02B 2027/014* (2013.01)

(58) Field of Classification Search
CPC ... G02B 2027/014; G06F 3/013; G06T 3/608; G06T 15/10; G06T 3/40
See application file for complete search history.

(56) References Cited

U.S. PATENT DOCUMENTS

| | | | |
|---|---|---|---|
| 2010/0238280 A1* | 9/2010 | Ishii | G02B 27/01 348/77 |
| 2011/0298928 A1* | 12/2011 | Chen | H04N 7/181 348/149 |
| 2013/0096820 A1* | 4/2013 | Agnew | B60R 1/00 701/428 |
| 2014/0078282 A1* | 3/2014 | Aoki | G06V 20/597 348/78 |
| 2019/0300003 A1* | 10/2019 | Shiraishi | G06F 3/011 |
| 2020/0036911 A1* | 1/2020 | Mukherjee | B60R 1/002 |
| 2020/0086790 A1 | 3/2020 | Gallagher | |
| 2020/0090375 A1 | 3/2020 | Mori et al. | |

OTHER PUBLICATIONS

Tarel, J., et al., "Improved Visibility of Road Scene Images under Heterogeneous Fog", Jul. 2010, 8 pgs.

Dong, N., et al. "Adaptive Object Detection and Visibility Improvement in Foggy Image", Journal of Multimedia, vol. 6, No. 1, Feb. 2011, 9 pgs.

Greeshma, G., et al., "Obstacle Detection of Vehicles Under Fog", International Journal of Simulation: Systems, Science and Technology, Feb. 27, 2019, pp. 27.1-27.8 (8 pgs.).

Gao, L., et al., "RASWNet: An Algorithm That Can Remove All Severe Weather Features from a Degraded Image", IEEE Access, vol. 8, Apr. 21, 2020, pp. 76002-76018.

Mell, Peter, et al., "The NIST Definition of Cloud Computing", NIST Special Publication 800-145, Sep. 2011, Gaithersburg, MD, 7 pgs.

International Search Report and Written Opinion for PCT/EP2022/075812 completed Jan. 25, 2023, 9 pgs.

* cited by examiner

COMPUTER-IMPLEMENTED OBJECT VISIBILITY IMPROVEMENT BY INTERPOSING AN IMAGE IN A VIEWER'S LINE-OF-SIGHT

BACKGROUND

Operating a motor vehicle requires visibility of road and other features. The vehicle driver's ability to see features of the road and surrounding environment is one aspect of safe vehicle operation. It is generally preferred that operators of a motor vehicle have clear visibility to objects in the environment.

SUMMARY

Shortcomings of the prior art are overcome and additional advantages are provided through the provision of a computer-implemented method. The method determines that visibility of an object in a view of a vehicle occupant through a transparent surface of the vehicle is degraded. The object is in an environment in which the vehicle travels. The method selects from an image repository a reference image of the object. The method also extracts, from the reference image, an image portion that includes an image of a least a portion of the object. The method transforms the extracted image portion to correspond to the view of the vehicle occupant. The transforming produces a transformed image portion. Additionally, the method displays the transformed image portion on the transparent surface and interposed in a line-of-sight of the vehicle occupant to the object in the environment such that the transformed image portion overlays at least a portion of the vehicle occupant's view through the transparent surface to the object in the environment.

Further, a computer system is provided that includes a memory and a processor in communication with the memory, wherein the computer system is configured to perform a method. The method determines that visibility of an object in a view of a vehicle occupant through a transparent surface of the vehicle is degraded. The object is in an environment in which the vehicle travels. The method selects from an image repository a reference image of the object. The method also extracts, from the reference image, an image portion that includes an image of a least a portion of the object. The method transforms the extracted image portion to correspond to the view of the vehicle occupant. The transforming produces a transformed image portion. Additionally, the method displays the transformed image portion on the transparent surface and interposed in a line-of-sight of the vehicle occupant to the object in the environment such that the transformed image portion overlays at least a portion of the vehicle occupant's view through the transparent surface to the object in the environment.

Yet further, a computer program product including a computer readable storage medium readable by a processing circuit and storing instructions for execution by the processing circuit is provided for performing a method. The method determines that visibility of an object in a view of a vehicle occupant through a transparent surface of the vehicle is degraded. The object is in an environment in which the vehicle travels. The method selects from an image repository a reference image of the object. The method also extracts, from the reference image, an image portion that includes an image of a least a portion of the object. The method transforms the extracted image portion to correspond to the view of the vehicle occupant. The transforming produces a transformed image portion. Additionally, the method displays the transformed image portion on the transparent surface and interposed in a line-of-sight of the vehicle occupant to the object in the environment such that the transformed image portion overlays at least a portion of the vehicle occupant's view through the transparent surface to the object in the environment.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
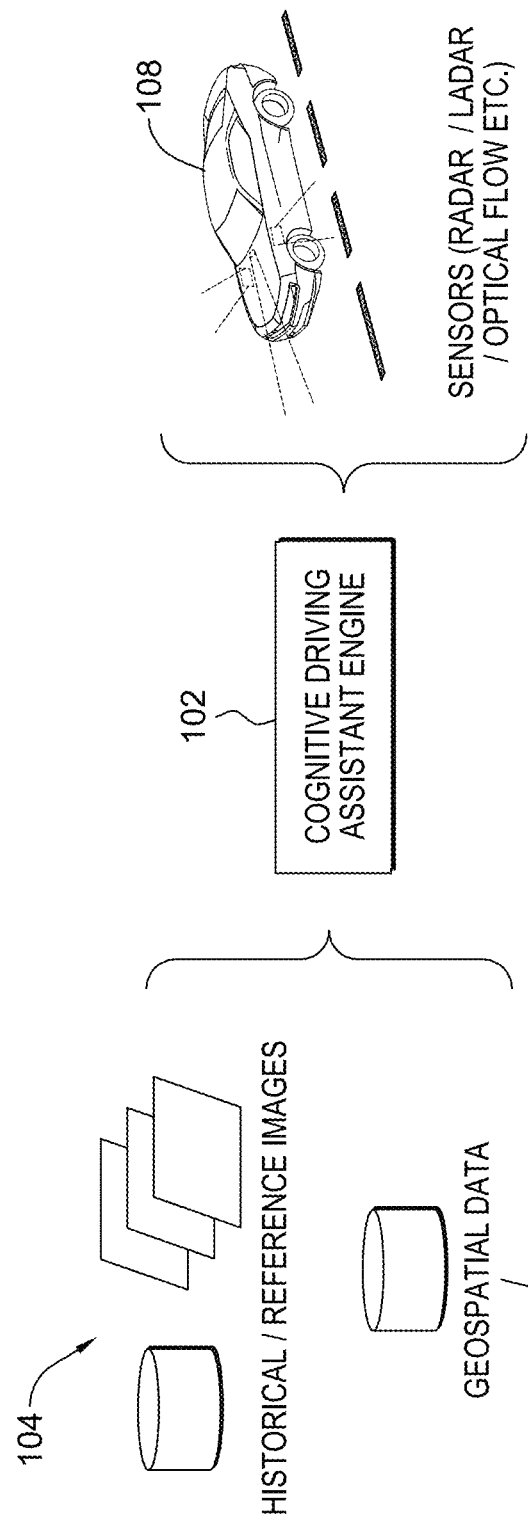
FIG. 1 depicts a conceptual representation of a system for cognitive driving assistance, in accordance with aspects described herein.

Described herein are approaches for interposing images in lines-of-sight of vehicle occupants. The interposing may be performed in situations of degraded visibility to objects in an environment in which a vehicle travels. Fog or other environmental conditions might make it difficult for a driver (or other occupant) of a motor vehicle to look through the windshield, window, or other transparent surface of the vehicle and clearly see an object in the environment. Images of the object taken previously e.g., in clearer conditions, can be displayed on the windshield/window/transparent surface in the occupant's line-of-sight to overlay the vehicle occupant's view (of degraded visibility) to that object at the time. The position and other characteristics of the displayed image can be updated as the vehicle moves so that the image remains in the occupant's line-of-sight to the object, overlaying the object in the occupant's view so that the occupant sees a clear picture of the object. Embodiments and examples presented herein describe a driver of the vehicle as being the subject vehicle occupant, but this is by way of example only; aspects can apply to provide consolidated views as described herein for other occupants (non-driver passengers) if desired. Additionally, examples described herein are presented using an automobile/car as the vehicle, however embodiments described herein can be used in conjunction with transparent surfaces (e.g. transparent glass or plastic panes such as windows or windshields) of any type of vehicles, such as automobiles, busses, motorcycles, all-terrain vehicles, snowmobiles, airplanes, aircrafts, and boats, ships, personal watercraft, and other vessels, as examples.

An image can be interposed in a user's line-of-sight to an object such that the image overlays object in the user's view The image could be presented on, in these examples, a windshield or other transparent surface of the vehicle. The vehicle could include, as examples, a heads-up display (HUD), a transparent display screen, a projection device to project images onto a surface, or any other technology that can display images on/in a windshield/window, as a transparent display device for displaying images. Thus, examples herein discussing visibility through a windshield are equally applicable to windows or other partially or fully transparent surfaces through which a vehicle occupant, passenger, rider, or user might view an environment in which the vehicle travels.

Certain driving conditions, particularly those that negatively affect the driver's ability to see road features and other objects, can be dangerous. Fog, rain, snow, sleet, hail, and other weather-related conditions can severely diminish the driver's ability to see the object ahead, creating a hazardous situation. Avoiding driving in these situations is a safe option but sometimes this is not possible. Drivers seldom examine weather conditions and forecast in preparation for extreme conditions like fog while they are driving. Even in cases where the driver sees a favorable (clear) weather forecast, this is no guarantee that fog or other conditions adverse to driver visibility might not appear anyway. Due to lack of predictability in this regard, drivers should be alert so that they can react if they encounter conditions of poor visibility.

Aspects provide technology to assist drivers in conditions (such as fog) when driver visibility though, e.g., the vehicle windshield or other transparent surface to the environment surrounding the vehicle is poor. In some aspects, this is provided by a driver assistant system based on a cognitive framework. The framework processes reference images of features/objects of the environment. The reference images can then be used to provide image overlays placed in a driver's line-of-sight so that the driver can 'see' the object in the environment with greater clarity. This provides better 'visibility' to objects in the environment in conditions of decreased driver visibility. These aspects can also be provided for other vehicle occupants.

Aspects can therefore provide a consolidated view of the environment outside of a vehicle. In specific embodiments, the consolidated view includes processed reference images projected or presented on a vehicle windshield, together with the occupant's view through the windshield to the environment. Due to weather or other conditions that negatively affect the occupant's view to the outside environment, the occupant's visibility of some objects of the environment may be poor. The processed reference images are presented on the vehicle windshield to interpose them into the driver's view to the poorly visible objects. This view is a consolidation of (i) the driver's view through the windshield with (ii) a layer of system-generated, interposed image(s) of the objects. The driver sees a combination of the environment outside the vehicle along with graphics/images, of objects of that environment, that were previously acquired when visibility to the object was clearer.

Reference images can be obtained from any of various sources. Examples include, but are not limited to, cameras of other vehicles (dashcams, etc.) that previously passed through the area, internet content such as social media posts, historical photographs of buildings, 'street view' data captured from 3D road mapping, and others. The images could include various images of each of the objects in the environment, for instance images of an object viewed from different perspectives, angles, zooms, orientations, rotations, and so on. By providing several images reflecting different views of a same object, the system can select and use a reference image more closely aligning with the current view to the object of the vehicle occupant for which the consolidated view is to be provided. The geolocation of the vehicle may be known at any given time and image data can be stored with geolocation data to facilitate correlation between the vehicle's current position and images of objects in the environment surrounding that position. Objects can include any physical objects, such as buildings, signs, poles, road features (turns, elevation changes, construction equipment, potholes, etc.). In enhancements, features of the consolidated view (positioning of objects, etc.) can be validated with SONAR technology to ensure that the presentation of objects in the consolidated view are consistent with the actual object characteristics in the environment at that time. This could be used to identify situations where another vehicle or other object in the environment blocks a vehicle occupant's view to an object in the background, whereby presenting the object in the background with greater clarity (using a reference image) might give a false impression that there are no other objects between the vehicle and the object in the background.

A reference image that depicts an object in relatively clear visibility can be processed (e.g. cropped) to isolate the image data corresponding to that object. The cropped image can be resized as appropriate to match or approximate a size of the object as it would in the driver's then-current view of the object through the vehicle windshield. In some aspects, the cropped image is mapped into a polar coordinate representation. A detection algorithm can identify the object (position, size, orientation/rotation, etc.) in the driver's view and interpose the cropped, processed image in the driver's line-of-sight to that object, for instance by projecting the image onto the vehicle windshield.

As the vehicle changes position relative to fixed objects in the environment, for instance by driving down a roadway or executing a turn, the position of the object in the driver's view and the angle of the driver's line-of-sight to the object changes. The positioning and size of the object in the occupant's view therefore changes. The size, position, orientation, etc. of the interposed image(s) in the driver's view can be updated accordingly so that they continuously overlay the object (relative to the viewer's viewpoint to the object) with appropriate dimensions as the vehicle moves. By converting image data into a polar coordinate system from Euclidean two-dimensional (2D) space, this enables application of the proper skews and other properties to the cropped images to account for curvature in the transparent surface (e.g. windshield) and changing angles from which the object is visible to vehicle occupants. As an example, the line-of-sight from a vehicle occupant to an object at a fixed location in the environment remains constant when the vehicle is stopped. If, however, the vehicle executes a turn, then the line-of-sight changes with the change in polar angle. The curvature to be applied to the reference image (or another reference image of the object taken from a different angle) can also change accordingly.

The consolidated view thereby provides a blend of the occupant's real view to the environment with images providing clearer visibility of environment objects and can be updated as the occupant moves relative to the object so that the interposed image(s) of the object remain positioned and sized consistent with what the object would look like in occupant's view to the object through the transparent surface if the object were visible with greater clarity.

In this manner, aspects create an imposition of a recognized, previously obtained image into to the existing view of a vehicle occupant.

Preprocessing for overlay recognition includes initializing a measuring range, boundary start, boundary end, and initial overlay position for an image to be interposed in the viewer's line-of-sight to an object in the environment for which its visibility is diminished. The object in the reference area is turned around the axis in the sector or circle region and exhibits a deep hue straight superimposition compared with a light reference area. Hue of an image corresponds to lightness that can correspond to conditions of fog, snow, or other weather conditions negatively affecting visibility. This significant feature can be used for object location. The revised image, digitally speaking, has transformed coordinates and thus a new symmetry axis can be determined. This can performed quickly, for instance via linear transformation on a lower dimension/rank, as a 'fast superimposition'.

To facilitate a process that obtains a proper source 2D image, processes it to extract what is needed (e.g. image data of an object) and convert the relevant portion to a polar coordinate system, then stitches the processed image into the view of the vehicle occupant, a layering principle is applied. Two arbitrary references can determine the parameter of one polar coordinate of an object in a portion of the occupant's view for image imposition. Taking two points in Euclidean (two-dimensional) space and projecting them to polar coordinate space results in an arc with a curvature that depends on a viewer position and curvature of the windshield. This informs a curvature to apply to the extracted portion of the 2D reference image. This principle can be applied to test whether other points fall into the range of that parameter. The object to be presented more clearly to the viewer appears in some region/area of the viewer's view through the windshield to the environment. A point in that region, such as a center point, is identified and the extracted portion of the reference image can be fit to the region, anchored at the center point, for instance. The determined curvature can be applied to impart a curvature/skew to the extracted portion.

On a successful overlay of the extracted portion, the boundary values are recorded to recognize and trigger imposing the extracted portion over the identified object. Starting from the object's initial location in the viewer's view, a process can continue to recognize the object's changing position in the viewer's view (caused by movement of the vehicle) and sequentially repeat the overlaying using updated boundaries of the object in the viewer's view. This tracks the interposed image in the viewer's view over the object's changing position in the user's view to continually 'overlay' the object with the interposed image. As some point it might be determined that a better reference image exists and, at that point, the process can change the interposed image to be extracted image data from the better reference image (for instance if the vehicles has made a turn and views a different side of the object, as one example). Fast detection of object reposition in the viewer's field of view can be used.

As noted, sonar or other technology can be leveraged to validate in real time that the consolidated view is portraying an accurate depiction of the object in the viewer's field of view, in terms of object distance, size, etc.

The solution provides a consolidated, overlaid view on a vehicle windshield or other transparent surface to assist vehicle occupants when visibility conditions are poor. In some aspects, this is applied for drivers of a vehicle to aid safe driving.

Enhancements can provide real-time alerts/notifications to other vehicles and occupants thereof that may be encountering the conditions of diminished visibility, for instance drivers navigating along the same route. This notice enables the drivers to take precautionary actions like reducing vehicle speed or looking for an alternate route.

This can reduce the risk of accidents or fatalities due to bad weather conditions, as it provides driver with consolidated, overlaid views to make decisions when driving in bad weather conditions. The consolidated view is akin to a video that is played on the transparent surface to display objects that exist in the environment but that the viewer might otherwise fail to see due to actual visibility problems at the time. The consolidated view could help on-road emergency vehicles more quickly and safely traverse through areas in which visibility is diminished, enabling faster response times.

Aspects can assist with both visibility improvement in various weather conditions that reduce visibility, and identification of otherwise difficult-to see elements on the road, such as objects crossing a road, potholes, and road signs.

FIG. 1 depicts a conceptual representation of a system for cognitive driving assistance, in accordance with aspects described herein. A cognitive driving assistant engine 102 includes processes for performing aspects described herein. The engine 102 consumes historical/reference images 104 and geospatial data 106 to understand geographic positions of pictured objects. The engine 102 is aware of a vehicle's current position, trajectory, etc. and can therefore identify imaged objects that the vehicle occupants might see in the environment but for conditions of poor visibility. The engine performs processes described herein to provide a consolidated view for occupant(s) and can leverage validation data from sensors 108 to validate that the objects being interposed in the viewer's view are provided with the proper angles, distance, etc. to the real-world objects in the environment.

Figure 2:
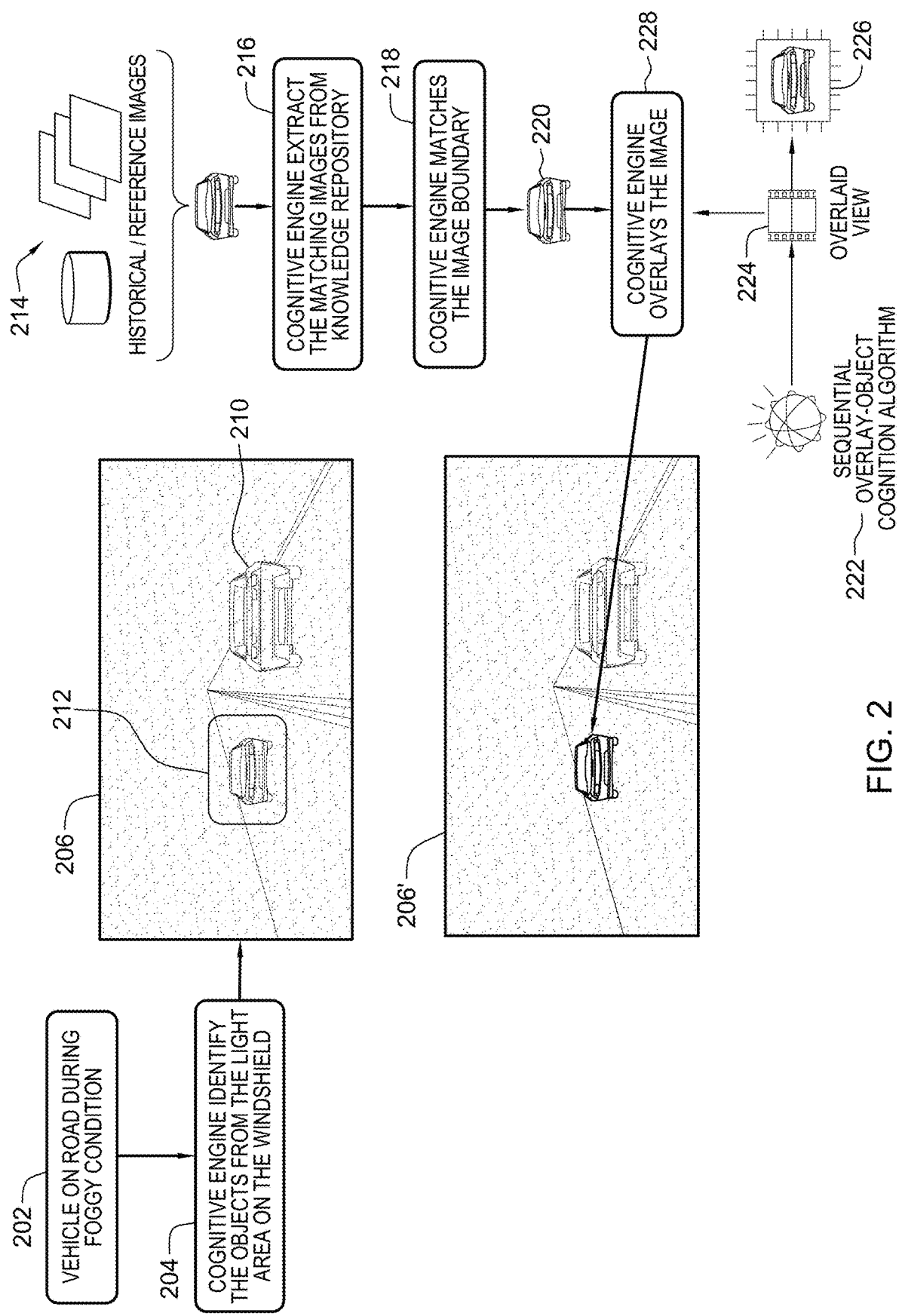
FIG. 2 depicts a conceptual diagram of a process for providing a consolidated view to a vehicle occupant in conditions of poor visibility, in accordance with aspects described herein.

FIG. 2 depicts a conceptual diagram of a process for providing a consolidated view to a vehicle occupant in conditions of poor visibility, in accordance with aspects described herein. During conditions of fog or other visual obstructions, typically weather-related, a process can detect such conditions (202) and trigger a cognitive engine to identify objects in the viewer's view that as obscured, for instance significantly light in hue. Fog between a driver and an object in the distance will act as a filter that lightens the hue of the object in the driver's view. Stereo vision, optical flow, RADAR (Radio Detection and Ranging), LIDAR (Light Detection and Ranging or Laser Imaging, Detection, and Ranging), SONAR (Sound Navigation and Ranging) and other detection modalities can be leveraged in this regard for object detection.

206 presents an example view that the driver operating a vehicle on a roadway sees through the windshield in foggy conditions. The vehicle is traveling on the right side of the roadway behind vehicle 210. Approaching the driver and traveling in the opposite direction on the left side of the road is another vehicle in region 212. The cognitive engine can determine to provide a consolidated view that overlays an image of a vehicle over the driver's view to region 212, stitching the image into region 212 and thereby presenting an object in region 212 that is more easily seen and recognized. The cognitive engine can retrieve image(s) of the driver's view and identify an object that is at least partially obscured. It extracts (216) different properties (dimensions, features, etc.) of the object and can extract from one or more image repositories (214) reference images depicting the object or one similar thereto to represent the object in the consolidated view.

There may be other object detection devices on the vehicle that send indications of other obstacles like potholes or other features to the cognitive engine, which can also be used as an input during the image overlaying process.

The cognitive engine also undertakes a process to overlay extracted and processed image data onto the vehicle windshield to overlay the driver's view to region 212. The cognitive engine identifies region 212 and finds image data that 'matches' what is depicted in the region—usually one or more objects. In this example, there is one object of interest, the oncoming vehicle in region 212. 'Matching' in this sense could identify a picture of a vehicle with same or similar characteristics to the vehicle in region 212. The region 212 forms a boundary that can be correlated to the image data in order to identify which portion of a reference image is to be extracted and processed. The boundary can correlate to the entire region 212 itself or (as in this example) the outline of the oncoming vehicle in region 212. In any case, the engine matches the boundary (218) to produce an extracted image 220 to interpose in the driver's view.

This consolidated view can be formed by projecting the extracted processed image onto the windshield in a manner that the driver sees portions of the actual view to the environment as well as system-generated image elements projected onto the vehicle windshield. In other examples, the windshield comprises an active transparent display capable of displaying images thereon (i.e. rather than merely acting as a medium onto which to project images), and the images are interposed by activating the display (windshield) in the relevant areas thereof to display the image(s) to be interposed.

Because the vehicle may be moving, the position, size, location, and other properties of the obscured object in the driver's view may change. The cognitive engine can therefore utilize a sequential overlay-object cognition algorithm 222 to continually update the image(s) to display in the consolidated view and update the parameters (position, size, etc.) of those images. When a vehicle approaches and passes a building, the position of the building in the driver's view changes; the building generally moves across the driver's view toward the right or left. An image overlaying the building can therefore be traced to the right or left to track the changing position of the building in the user's view. Meanwhile, the size of an object in a viewer's view increases as the distance between the viewer and the object decreases. Thus, when a vehicle approaches and passes a building, the size of the building in the driver's view also changes. The image overlaying the building and therefore being traced to the right or left to track the changing position of the building in the user's view can be similarly processed to enlarge the image of the building as the vehicles passes the building (imparting a 'zoom-in'). At some point, it may be desired to switch to a different reference image from which to extract object image data. Using the above example, an image of the building taken from a far distance may be used when the vehicle is approximately that distance from the building in the environment and then as the vehicle moves closer to the building another reference image may be used—one depicting the building from a lesser distance.

The continual updating of the consolidated view results in an 'overlaid view' 224 (226 as an example) that spans a duration of time. During this time, the cognitive engine overlays 228 the image(s) with the proper dimensions, positioning, etc. in the driver's view. 206' presents an example consolidated view for the driver operating the vehicle in the example of FIG. 2. Image 220 is interposed in the driver's view to overlay region 212 or the vehicle therein, to which visibility is diminished. As noted, aspects described herein may apply not only to windshields as is the case in the above example but other transparent surfaces.

Figure 3:
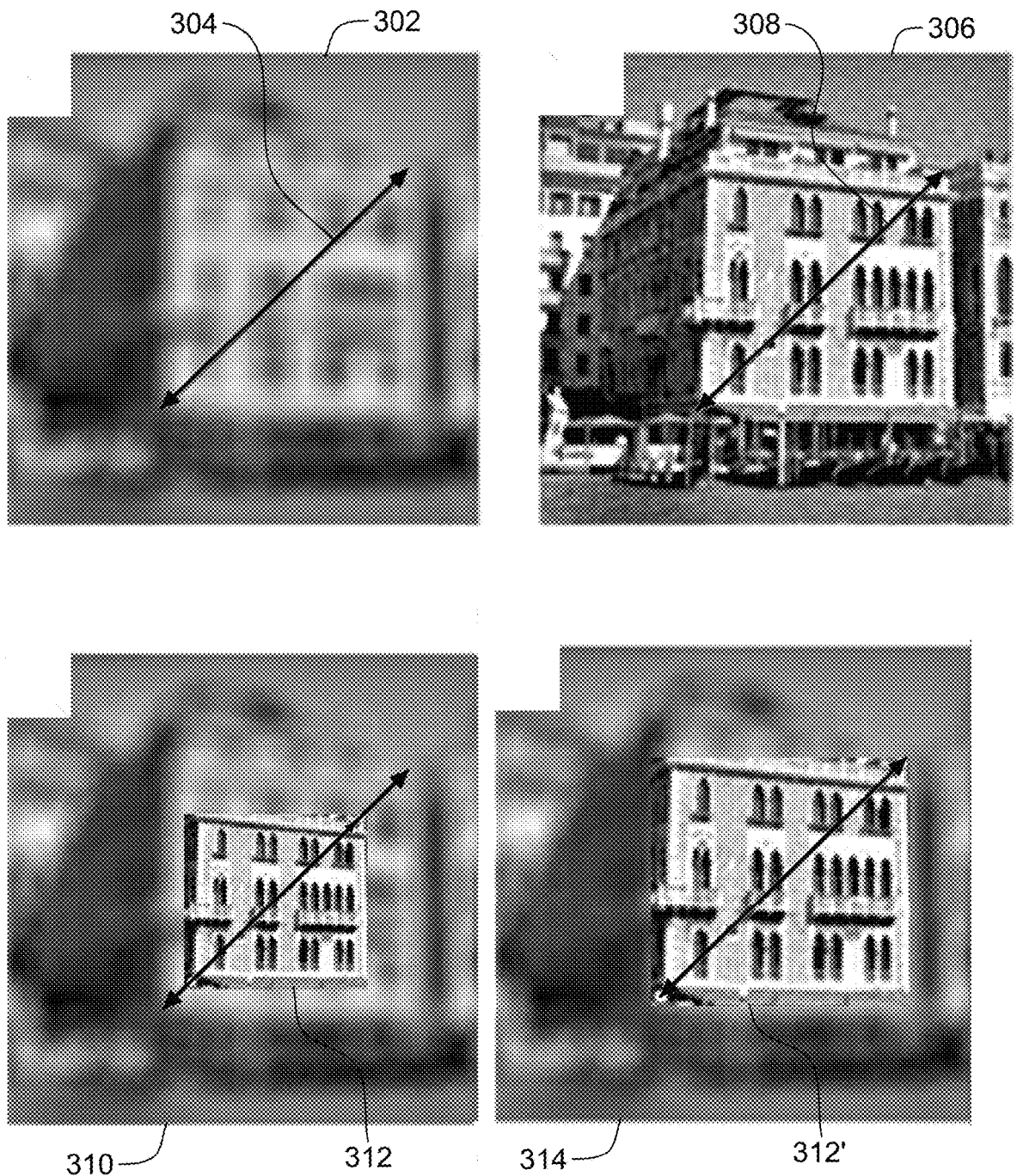
FIG. 3 depicts an example of extracting and processing object image data from a reference image, in accordance with aspects described herein.

FIG. 3 depicts an example of extracting and processing object image data from a reference image, in accordance with aspects described herein. 302 depicts a region of a vehicle occupant's view through a windshield of the vehicle to a surrounding environment in conditions of poor visibility. Poor visibility is due to fog in this example and thus the occupant's view to a building is blurred. Diagonal line 304 defines opposite corner points of a rectangular boundary of a view area to be enhanced, i.e. to overlay with a clearer image of the building from a reference image. Historical/reference image 306 is retrieved based on a correlation between the reference image, what it depicts, and a known location of the vehicle. The diagonal 308 defines a boundary of image data from image 306 to extract, process, and interpose in the occupant's view 302. A rectangular portion of image data is extracted from image 306 but is to be processed in this example because the vehicle is closer to the building than the point-of-view from which the reference image 306 was taken. In other words, reference picture was taken at a greater distance from the building than the distance between the building and the view of 302 (from inside the vehicle). The extracted image data, if interposed in the occupant's line-of-sight without resizing, would depict the building in smaller dimension than is appropriate. View 310 shows what this would look like. Extracted image data 310 is interposed in the line-of-sight to the building in the background but because the reference image was 'zoomed-out' relative to the view of 302/310, the extracted image data is processed to stretch in order to match the boundary defined by 304. In addition, the processing can impart a three-dimensional (3D) effect such as curvature or skew to the extracted image data to provide a depth element and/or account for windshield curvature for purposes of projecting an accurate looking image for the occupant. In general, the processing of extracted image data can impart a proper aspect ratio, polar coordinate ratio, stretching along the diagonal view, skew, or other effects to more accurately present the object as how the user would see it if visibility were better.

View 314 presents the consolidated view after the processed, extracted image data 312' is interposed in the user's view to the building. The user sees the foggy conditions surrounding the interposed image data 312' but is provided a 'clear' view to the building and features thereof, which can facilitate identifying the building, including positioning, size, and features thereof. This provides the vehicle occupants with a better understanding of the surrounding environment, providing safety and other advantages.

Generally speaking, aspects superimpose images of recognized objects, the images obtained from existing image repositories, in a vehicle occupant's line-of-sight. A process initializes the measuring range, boundary start, boundary end, and initial overlay position to overlay the user's view to an object, then uses a sequential overlay-object recognition to identify the overlay object. On successful overlay, the process records the boundary values to recognize and trigger superimposition of the identified object.

Preprocessing for Overlay Recognition:

In a proposed fast superimposition detection method, an object is thus taken as a straight superimposition and its symmetry axis is identified in the N×N binary edge image as:

$$\rho = x \cos \theta + y \sin \theta \quad \text{(Eq. 1)}$$

where, (x,y) is the measurement of the position of the object in x-y coordinates (Euclidean space), $\theta$ ($0 \leq \theta \leq \pi$) denotes the angle the normal superimposition makes with the x-axis and $\rho$ ($-N \leq \rho \leq 2\sqrt{N}$) is the normal distance from the origin to the line.

According to the layering principle, two arbitrary references can determine the parameter of one polar coordinate of an object ($\rho, \theta$):

$$\begin{cases} \theta = -\tan^{-1}\left(\dfrac{x_2 - x_1}{y_2 - y_1}\right) \\ \rho = x_2 \cos\theta + y_2 \sin\theta \end{cases} \quad \text{(Eq. 2)}$$

The above are eventually used in applying curvature to 2D image data from a reference image. Every point in a polar coordinate system is represented by a distance ($\rho$) of that point from center and the angle ($\theta$) that it has to a reference axis. The extracted image data can be processed pixel-by-pixel to reconstruct the extracted image data to impart a curvature effect such that the processed image data can be projected onto the curved windshield. It is noted that if the reference image where a 3D image with curvature already applied to the image data, this then aspect of the processing could be omitted.

Identifying the Overlay to Start the Image Recognition:

This principle can be applied to test whether other points fall into the range of that parameter and is applied to the reference area of the point. The arbitrary reference constructs the polar coordinates, and the other points that are identified in the locus of transformation can be used to check if the transformation is successful. In accordance with aspects described herein, a sequential overlay-object cognition algorithm is as follows:

Obtain the edge image/boundary, sequentially scan a feature point P from the edge image, and select it as a seed/anchor point. This enables identifying the anchor image from that point which will work as the new origin for transformation.

Create an m×m window centered at point P as one sub-neighborhood $W_p$, and perform a connective component search to the windowed edge points. Search for another feature point pi in Wp in turn and calculate parameters of straight lines according to Eq. 2. Until the 'scene' (set of features) changes, this is used as the reference. If the scene changes substantially enough, image might need revision.

Assume that the small divisions triangle $\rho$ and $\Delta\theta$ are the resolution of the parameter space. Voting in $W_p$, counting the number $n_i$ of parameters which fall into each parameter range ($\rho i + \Delta \rho$, $+\Delta\theta$).

Find the local maxima votes $n_{max}$ in the reference space, then calculate weighted mean value ($\bar{\rho}, \bar{\theta}$) of all ($\rho_j, \theta_j$) that fall into that window to reduce the influence of noise. Take ($\bar{\rho}, \bar{\theta}$) of all ($\rho_j, \theta_j$) serves as the straight superimposition parameter which pass through the point P in $W_p$.

Extend the calculation to the whole image, and calculate corresponding p according to Eq. 1 for each detecting point, as $\theta$ deference $\bar{\theta}$. If $|\rho - \bar{\rho}| < \Delta \rho$, then a straight superimposition is detected.

Initiate the values of ($x_{start}, y_{start}$), ($x_{end}, y_{end}$) and diagonalValue, to process a next 'frame' of the superimposition/consolidated view.

Object Recognition:

After finding the initial location of the object, the process can continue to recognize the object for purposes of tracing the imposed image(s) over the object as the viewer moves relative to the object. For the prior information, the boundary conditions, start position, end position we can initialize from the sequential overlay-object recognition algorithm above.

And the center we also check in preprocessing, object position is determined by fast superimposition detection. Hence, the boundary of the object is calculated as shown in Eq. 3. In Eq. 3, the ($x_{start}, y_{start}$), ($x_{end}, y_{end}$) and diagonalValue are initialized as above, ($x_{center}, y_{center}$) is determined by preprocessing, and the ($x_{point}, y_{point}$) is got through superimposition detection.

Hence, we can calculate the angle of the object to the start position, and the range angle can be also calculated as:

$$K_{start} = \dfrac{x_{start} - x_{centre}}{y_{start} - y_{centre}} \quad \text{(Eq. 3)}$$

$$K_{end} = \dfrac{x_{end} - x_{centre}}{y_{end} - y_{centre}} \quad \text{(Eq. 4)}$$

$$K_{point} = \dfrac{x_{point} - x_{centre}}{y_{point} - y_{centre}} \quad \text{(Eq. 5)}$$

$$\theta_{range} = \pi + \tan^{-1}\left(\dfrac{x_{start} - x_{centre}}{y_{start} - y_{centre}}\right) \quad \text{(Eq. 6)}$$

Triggering the Overlay Recognition Success to Superimpose Object:

We can then check if we have reached the diagonalValue, which would represent the reach of one of the boundaries:

$$\theta point = \quad \text{(Eq. 7)}$$

$$\begin{cases} \tan^{-1}\left(\dfrac{k_{start} - k_{point}}{1 + k_{start}k_{point}}\right), \dfrac{k_{start} - k_{point}}{1 + k_{start}k_{point}} \geq 0 \,\forall\, y_{point} - y_{centre} \leq 0 \\ \pi + \tan^{-1}\left(\dfrac{k_{start} - k_{point}}{1 + k_{start}k_{point}}\right), \dfrac{k_{start} - k_{point}}{1 + k_{start}k_{point}} \leq 0 \,\forall\, y_{point} - y_{centre} \geq 0 \end{cases}$$

We can superimpose the diagonalValue as, $$diagonalValue_{t1} = \dfrac{\theta_{point}}{\theta_{range}} \cdot diagonalValue_{t0} \quad \text{(Eq. 8)}$$

where $t_i$ is some time after time to and the viewer changed location between the two times. Eq. 8 will only superimpose once diagonalValue $\geq$, 1 thus triggering the flag to superimpose the image with the ($x_{start}, y_{start}$), ($x_{end}, y_{end}$) coordinates.

Figure 4:
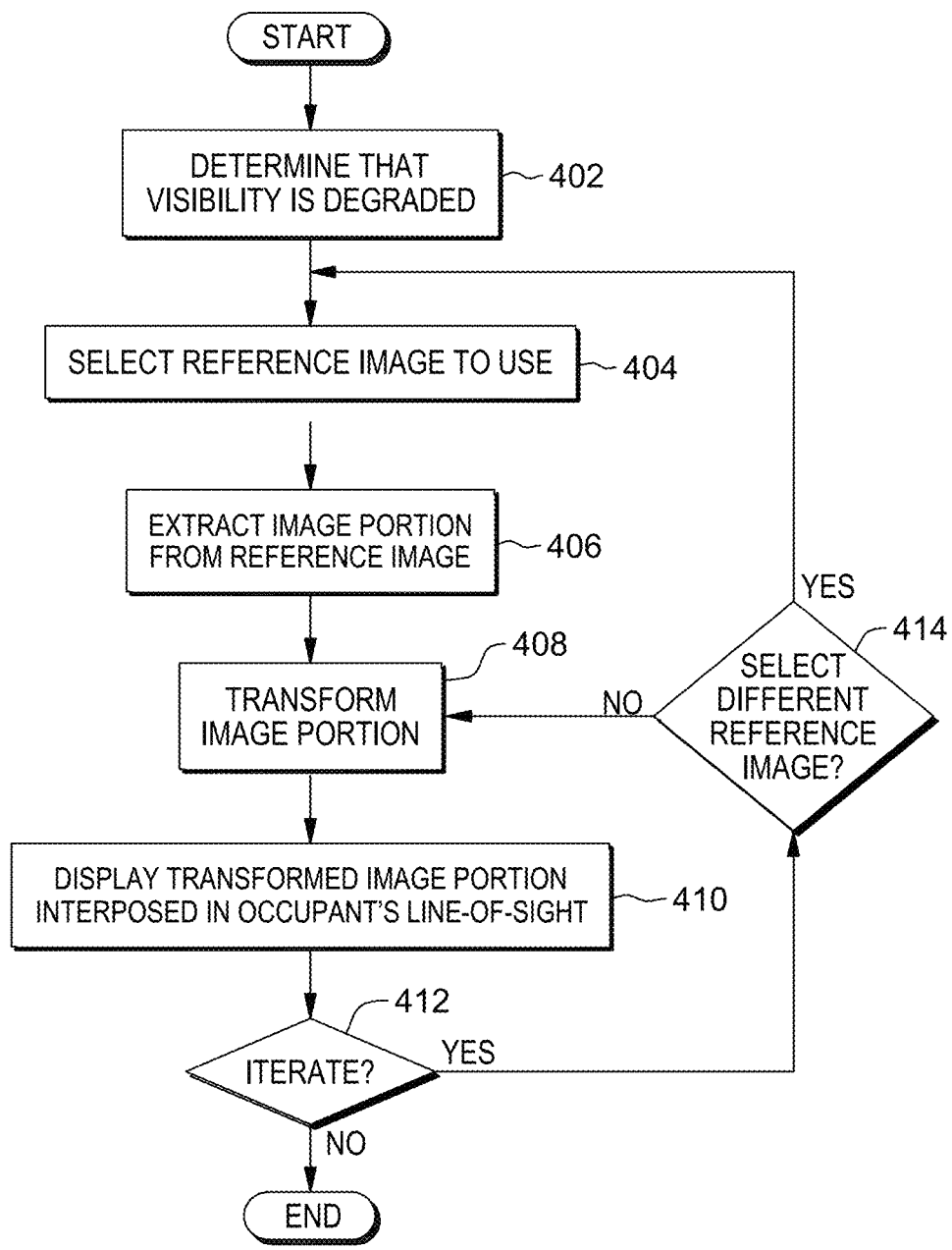
FIG. 4 depicts an example process for computer-implemented object visibility improvement by interposing images in a viewer's line-of-sight, in accordance with aspects described herein.

FIG. 4 depicts an example process for computer-implemented object visibility improvement by interposing images in a viewer's line-of-sight, in accordance with aspects described herein. In some examples, the process is performed by one or more computer systems, such as those described herein, which may include one or more computer systems of a vehicle in which occupants travel in an environment, one or more cloud servers in communication with the vehicle or component(s) thereof, and/or one or more other computer systems.

The process determines (402) that visibility of an object in a view of a vehicle occupant (such as a driver or other passenger; "viewer") through a windshield or other transparent surface of the vehicle is degraded. The vehicle travels in an environment and the object is in that environment. In some examples, the determination is made based on recognizing a condition of degraded visibility, for instance a weather or other environmental condition that reduces visibility in the environment. Example such weather conditions include fog, snow, sleet, and rain. Example other environmental conditions include smoke, smog, dust, or other debris that negatively impacts individuals' ability to see to objects in the environment.

The process then selects (404) from an image repository a reference image of the object. The reference image is one that was taken at some prior point in time and is ideally an image that relatively clearly depicts the object. The reference image could be selected a one that depicts the object from a vantage point as close as possible (of those available in the reference image databases) to a then-current vantage point of the occupant for which the process is constructing a consolidate view.

The process extract (406), from the reference image, an image portion that includes an image of a least a portion of the object. The reference image might include other features/objects than just the target object for which visibility is being enhanced by the process of FIG. 4, though it is noted that "object" as used in this disclosure could encompass the plural "objects", e.g. portion(s) of more than one object, if desired. Many objects, for instance buildings, are composed of several objects themselves, for instance. Additionally/alternatively, two or more buildings (or portions thereof) could be taken as the "object" for which a clarified view is being provided.

In any case, the extracted image portion extracted from the reference image, includes at least a portion of the target object. If the object to be clarified is a road sign, for example, the extracted image portion may be a clear picture of the sign portion but not the feet/poles mounting the road sign in place.

The process transforms (408) the extracted image portion to correspond to the view of the vehicle occupant. This transforming produces a transformed image portion. Generally, the transforming applies transformation(s) to make the image data from the reference image data conform to how it should appear so that when it is interposed in the viewer's view it stitches/blends well with the viewer's view through the transparent surface to the other features of the environment. Skew, stretch, resize, 'zoom' in or out, and other transformations may be made, in addition to applied filters such as brightness or contrast, as examples.

In some embodiments, the reference image includes/is made of two-dimensional (2D) image data in a 2D Euclidean space. The transforming (408) the extracted image portion can include converting that 2D image data to 3D image data in a polar coordinate space, which can facilitate imparting a curvature of the image portion for purposes of displaying it on the transparent surface in the viewer's line-of-sight to more seamlessly blend with the rest of the viewer's view to the environment outside the vehicle.

The process also displays (410) the transformed image portion on the transparent surface, interposed in a line-of-sight of the vehicle occupant to the object in the environment. The transformed image portion is displayed (positioned, etc.) such that it overlays at least a portion of the vehicle occupant's view through the transparent surface to the object in the environment. As part of this, the displaying determines, based on a line-of-sight of the vehicle occupant through the transparent surface to the object, an area of the occupant's view (to the environment) in which to display the transformed image portion. That area correlates to an area/position of the transparent surface. In other words, the viewer's line-of-sight to the object (if the viewer were to look at the object in the environment) intersects the transparent surface at some location, which informs where in the view to project the transformed image portion. A determination of the line-of-sight and area of the view can use sensors or object detection to identify a position of the object in the environment (even if human visibility is degraded) and the line-of-sight and area of the view can be determined based on that and the position of the viewer at the time.

The process proceeds by repeatedly iterating, across a length of time (for instance as long as the object remains at least partially in the view of the occupant), aspects of FIG. 4. The vehicle and its occupants might be moving, which is expected to change their position relative to the stationary objects in the environment. Accordingly, the position and other properties (angle, size, etc.) of the object in the viewer's view can change as the view's position relative to the object changes.

Thus, it is determined at 412 whether to iterate. As noted, this can be dependent on whether the object remains at least partially within the viewer's view to the environment. The process ends when it is determined not to iterate (412, N). Otherwise, it is determined to iterate (412, Y). Specifically, the iterating iterates the transforming and the displaying, where, at each iteration of the iterating, the transformed image portion is further transformed and the displaying displays the further-transformed image portion in a different area of the occupant's view based on movement of the vehicle between iterations. This is because the movement can produce a change in the line of line-of-sight of the vehicle occupant to the object—from a time 1 to a time 2 the vehicle has moved, which causes a change in the perspective of the viewer to the object. Therefore, the image portion may be further transformed to coincide with any change in the way the real object would appear to the viewers looking at the object through the transparent surface in conditions of clear visibility. For instance, if the vehicle is approaching the object, it may be expected that the object will grow larger as distance to it decreases, and portions of the object may disappear from view (the top of the building may be cut off from view by the roof of the vehicle as it approaches, for instance. By iterating, the process can continuously overlay the object in the environment with an ever-transforming reference image portion and update the position of the interposed transformed image portion to confirm to the changing line-of-sight of the vehicle occupant to the object, all across the length of time that the object remains in view (of degraded visibility to the viewer).

It is noted that at each iteration, the transformations could transform the original extracted image portion, or could transform the transformed image portion form the prior iteration. The latter may be preferred because the transformations would be made incrementally and could reduce processing relative to having to apply updated transformations to the original extracted image portion at each iteration.

The repeatedly iterating can identify, at each iteration, a boundary defining the area of the occupant's view in which to overlay the transformed image portion. That boundary defining the area corresponds to a region of the transparent surface to be 'covered' by the image data being displayed, and this boundary is expected to change continuously as the vehicle moves. The transforming done at each iteration transforms the image portion to fill the area defined by the identified boundary. It is expected that the iterating can be performed in very rapid duration, for instance 10-40 times per second in some examples, to provide an overlay that appears as a video to the viewer. The frequency of this iteration can be tailored to achieve any desired latency and usability parameters.

Referring to FIG. 4, the iterating can include an inquiry 414. At some point it may be determined to switch to using a different reference image based on movement of the vehicle. A better reference image may be available after such movement, for instance an image that depicts the object from a viewpoint that better correlates to where the viewer has relocated on account of the vehicle movement. On this basis the iterating may inquire whether to select a different reference image. If not, the process proceeds to 408 to repeat the transforming (408) and displaying (410). However, based on determining to select a new reference image (414, Y), the process returns to 404 to repeat the selecting, the proceeds to extract (406) a new image portion, transform (408) that, and then display (410), before continuing with the repeated iterations (using that new image portion).

It is noted that examples discussed display image portions on a vehicle windshield but the displaying may be on other windows or display surfaces of the vehicle, for instance door window(s) and/or rear window(s) of an automobile. Additionally or alternatively, the process of FIG. 4 can be performed for each of two or more occupants of the vehicle if desired. For instance, a passenger might view the environment through a door window and the process of FIG. 4 can be performed to display image portions on that door window in conditions of degraded visibility to objects in the environment. Additionally or alternatively, aspects described herein and with reference to FIG. 4 can be implemented in any situation in which a user views an environment through any transparent surface. As a specific example, a user walking, running, or otherwise traveling in an environment whether it be assisted by a vehicle or no could view the environment through a wearable or other mobile device, such as 'smart' or 'augmented reality' (AR) glasses that include one or more transparent surfaces (e.g. lenses), or other AR device, on which images can be projected/displayed to interpose such images in the user's line-of-sight when gazing through the transparent lenses.

Although various examples are provided, variations are possible without departing from a spirit of the claimed aspects.

Figure 5:
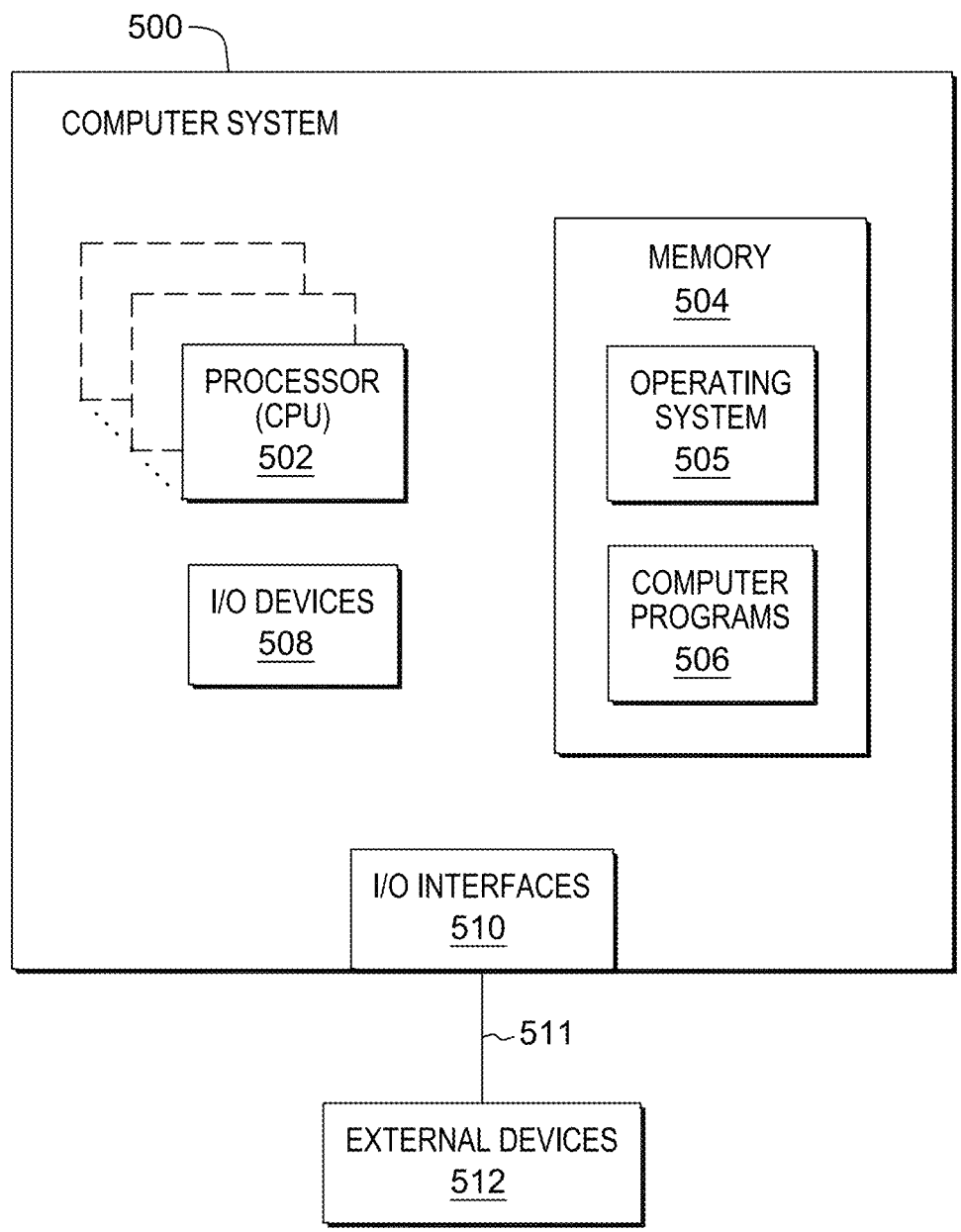
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
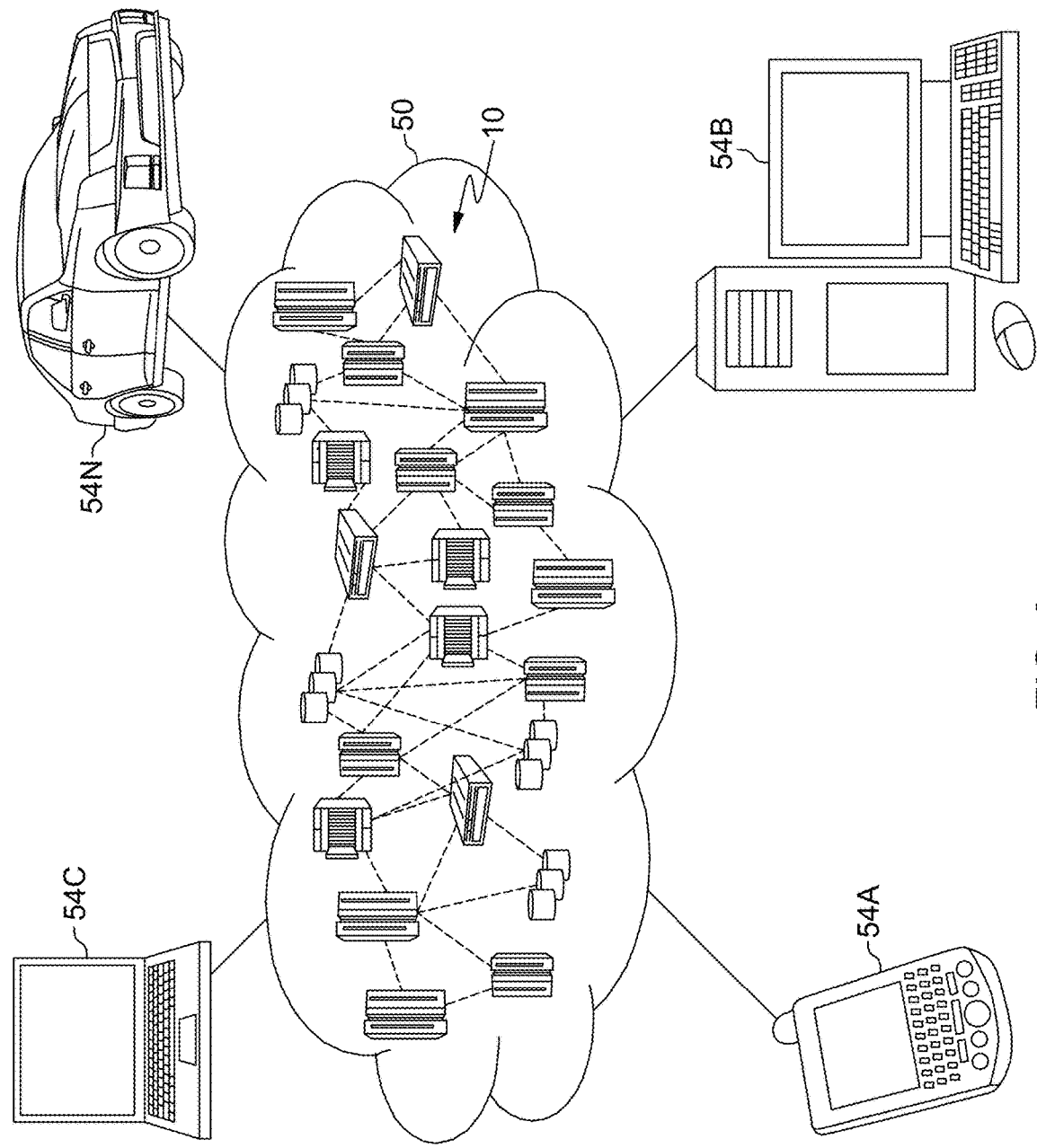
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
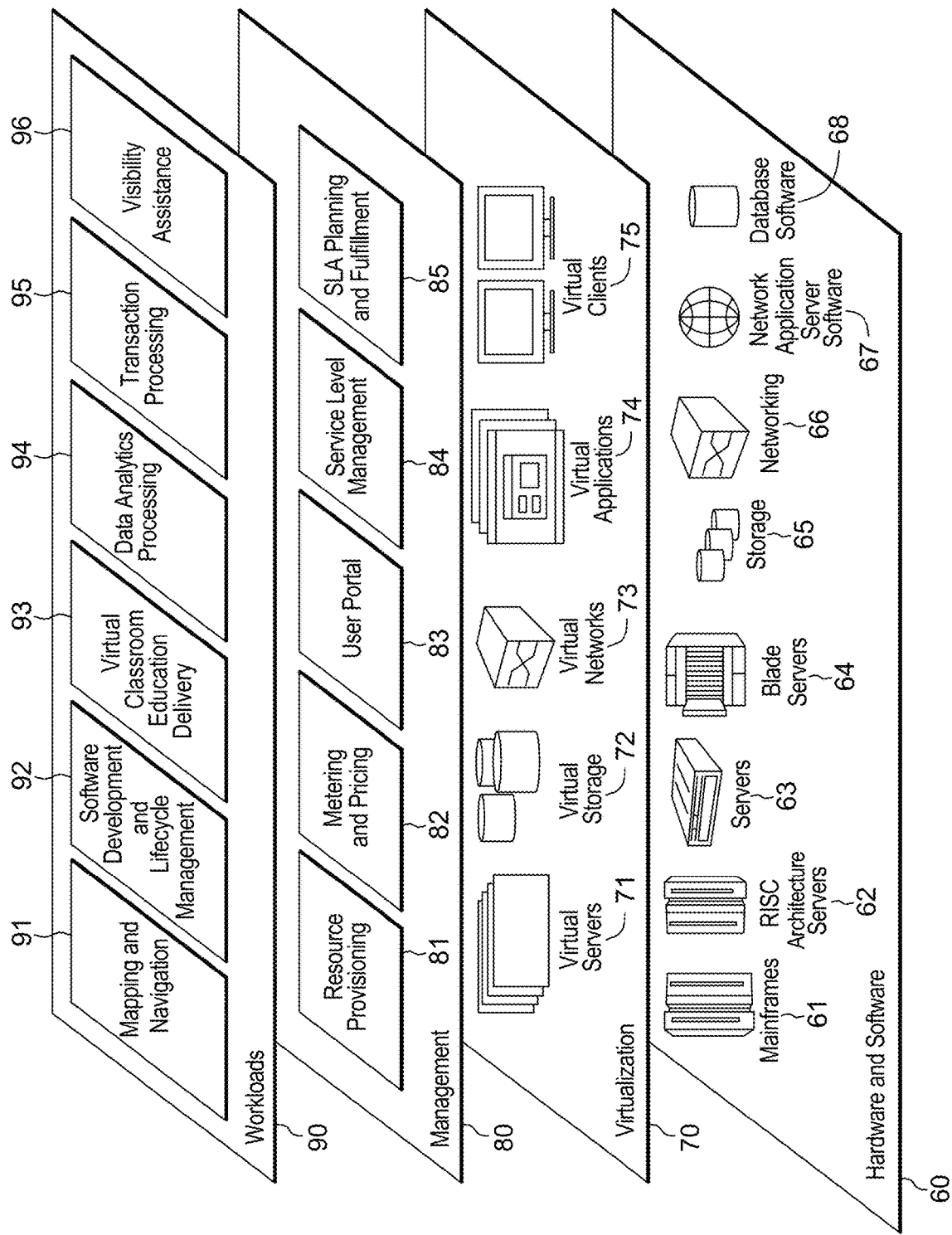
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and visibility assistance 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   determining that visibility of an object in a view of a vehicle occupant through a transparent surface of the vehicle is degraded, the object being in an environment in which the vehicle travels;
   selecting from an image repository a reference image of the object;
   extracting, from the reference image, an image portion comprising an image of at least a portion of the object;
   transforming the extracted image portion to correspond to the view of the vehicle occupant, the transforming producing a transformed image portion;
   displaying the transformed image portion on the transparent surface and interposed in a line-of-sight of the vehicle occupant to the object in the environment such that the transformed image portion overlays at least a portion of the vehicle occupant's view through the transparent surface to the object in the environment; and
   repeatedly iterating, across a length of time, the transforming and the displaying, wherein, at each iteration of the iterating, the transformed image portion is further transformed to update the transformed image portion, and the displaying displays the further-transformed image portion in a different area of the occupant's view based on movement of the vehicle between iterations.

2. The method of claim 1, wherein the determining is based on a condition of degraded visibility, the condition comprising a weather condition that reduces visibility in the environment.

3. The method of claim 1, wherein the reference image comprises two-dimensional (2D) image data in a 2D Euclidean space, and wherein the transforming the extracted image portion comprises converting the 2D image data to 3D image data in a polar coordinate space to facilitate imparting a curvature of the image portion when displayed on the transparent surface.

4. The method of claim 3, wherein the transforming the extracted image portion further comprises applying at least one selected from a group consisting of: a skew and a resize of the extracted image portion.

5. The method of claim 1, wherein the displaying comprises determining, based on a line-of-sight of the vehicle occupant through the transparent surface to the object, an area of the view in which to display the transformed image portion, the area correlating to a position of the transparent surface.

6. The method of claim 5, wherein the determining the area of the view uses sensors or object detection to identify a position of the object and determine the line-of-sight to the object and area of the view in which to display the transformed image portion.

7. The method of claim 1, wherein the movement of the vehicle between iterations produces a change in the line of line-of-sight of the vehicle occupant to the object, wherein the repeatedly iterating maintains the transformed image portion in the changing line-of-sight of the vehicle occupant to the object across the length of time as the vehicle moves.

8. The method of claim 7, wherein the repeatedly iterating identifies, at each iteration, a boundary defining the area of the occupant's view in which to overlay the transformed image portion, and wherein the transforming at that iteration transforms the image portion to fill the area defined by the identified boundary.

9. The method of claim 7, further comprising, based on determining to select a new reference image, repeating the selecting, the extracting, the transforming, the displaying, and the repeatedly iterating to display a transformed image portion from the new reference image.

10. A computer system comprising:
    a memory; and
    a processor in communication with the memory, wherein the computer system is configured to perform a method comprising:
       determining that visibility of an object in a view of a vehicle occupant through a transparent surface of the vehicle is degraded, the object being in an environment in which the vehicle travels;
       selecting from an image repository a reference image of the object;
       extracting, from the reference image, an image portion comprising an image of at least a portion of the object;
       transforming the extracted image portion to correspond to the view of the vehicle occupant, the transforming producing a transformed image portion;
       displaying the transformed image portion on the transparent surface and interposed in a line-of-sight of the vehicle occupant to the object in the environment such that the transformed image portion overlays at least a portion of the vehicle occupant's view through the transparent surface to the object in the environment, and
       repeatedly iterating, across a length of time, the transforming and the displaying, wherein, at each iteration of the iterating, the transformed image portion is further transformed to update the transformed image portion, and the displaying displays the further-transformed image portion in a different area of the occupant's view based on movement of the vehicle between iterations.

11. The computer system of claim 10, wherein the determining is based on a condition of degraded visibility, the condition comprising a weather condition that reduces visibility in the environment.

12. The computer system of claim 10, wherein the reference image comprises two-dimensional (2D) image data in a 2D Euclidean space, and wherein the transforming the extracted image portion comprises converting the 2D image data to 3D image data in a polar coordinate space to facilitate imparting a curvature of the image portion when displayed on the transparent surface.

13. The computer system of claim 10, wherein the displaying comprises determining, based on a line-of-sight of the vehicle occupant through the transparent surface to the object, an area of the view in which to display the transformed image portion, the area correlating to a position of the transparent surface, wherein the determining the area of the view uses sensors or object detection to identify a position of the object and determine the line-of-sight to the object and area of the view in which to display the transformed image portion.

14. The computer system of claim 10, wherein the movement of the vehicle between iterations produces a change in the line of line-of-sight of the vehicle occupant to the object, wherein the repeatedly iterating maintains the transformed image portion in the changing line-of-sight of the vehicle occupant to the object across the length of time as the vehicle moves.

15. The computer system of claim 14, wherein the method further comprises, based on determining to select a new reference image, repeating the selecting, the extracting, the transforming, the displaying, and the repeatedly iterating to display a transformed image portion from the new reference image.

16. A computer program product comprising:
a computer readable storage medium readable by a processing circuit and storing instructions for execution by the processing circuit for performing a method comprising:
determining that visibility of an object in a view of a vehicle occupant through a transparent surface of the vehicle is degraded, the object being in an environment in which the vehicle travels;
selecting from an image repository a reference image of the object;
extracting, from the reference image, an image portion comprising an image of at least a portion of the object;
transforming the extracted image portion to correspond to the view of the vehicle occupant, the transforming producing a transformed image portion;
displaying the transformed image portion on the transparent surface and interposed in a line-of-sight of the vehicle occupant to the object in the environment such that the transformed image portion overlays at least a portion of the vehicle occupant's view through the wind transparent surface shield to the object in the environment, and
repeatedly iterating, across a length of time, the transforming and the displaying, wherein, at each iteration of the iterating, the transformed image portion is further transformed to update the transformed image portion, and the displaying displays the further-transformed image portion in a different area of the occupant's view based on movement of the vehicle between iterations.

17. The computer program product of claim 16, wherein the reference image comprises two-dimensional (2D) image data in a 2D Euclidean space, and wherein the transforming the extracted image portion comprises converting the 2D image data to 3D image data in a polar coordinate space to facilitate imparting a curvature of the image portion when displayed on the transparent surface.

18. The computer program product of claim 16, wherein the displaying comprises determining, based on a line-of-sight of the vehicle occupant through the transparent surface to the object, an area of the view in which to display the transformed image portion, the area correlating to a position of the transparent surface, wherein the determining the area of the view uses sensors or object detection to identify a position of the object and determine the line-of-sight to the object and area of the view in which to display the transformed image portion.

19. The computer program product of claim 16, wherein the movement of the vehicle between iterations produces a change in the line of line-of-sight of the vehicle occupant to the object, wherein the repeatedly iterating maintains the transformed image portion in the changing line-of-sight of the vehicle occupant to the object across the length of time as the vehicle moves.

20. The computer program product of claim 19, wherein the method further comprises, based on determining to select a new reference image, repeating the selecting, the extracting, the transforming, the displaying, and the repeatedly iterating to display a transformed image portion from the new reference image.

* * * * *